S. DONNER.
BEET BLOCKER.
APPLICATION FILED APR. 27, 1920.
1,394,152.
Patented Oct. 18, 1921.
2 SHEETS—SHEET 1.
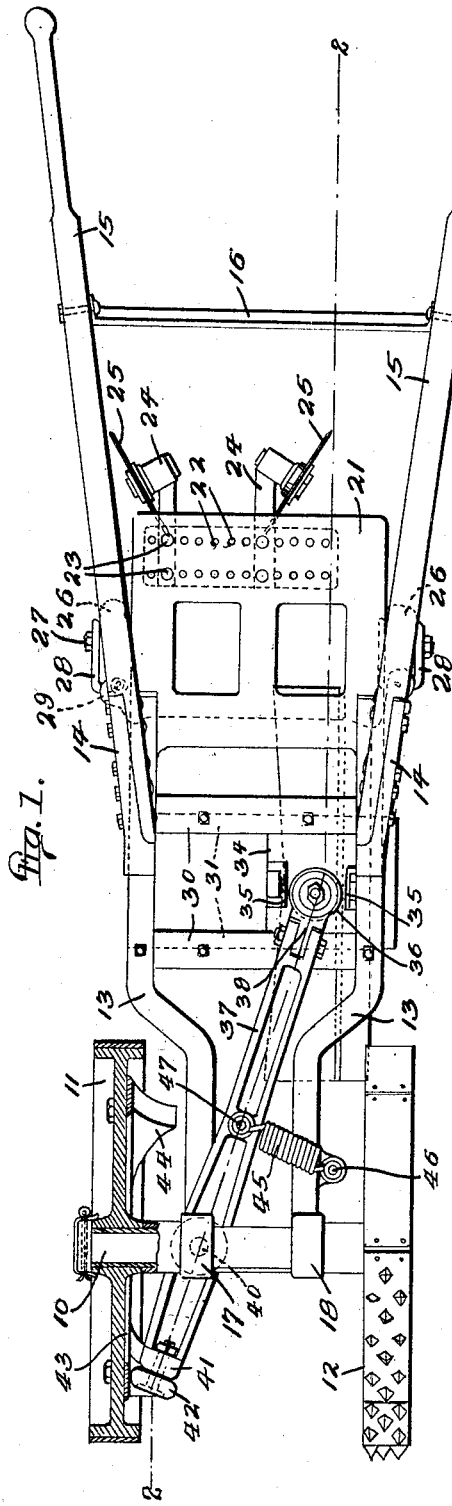
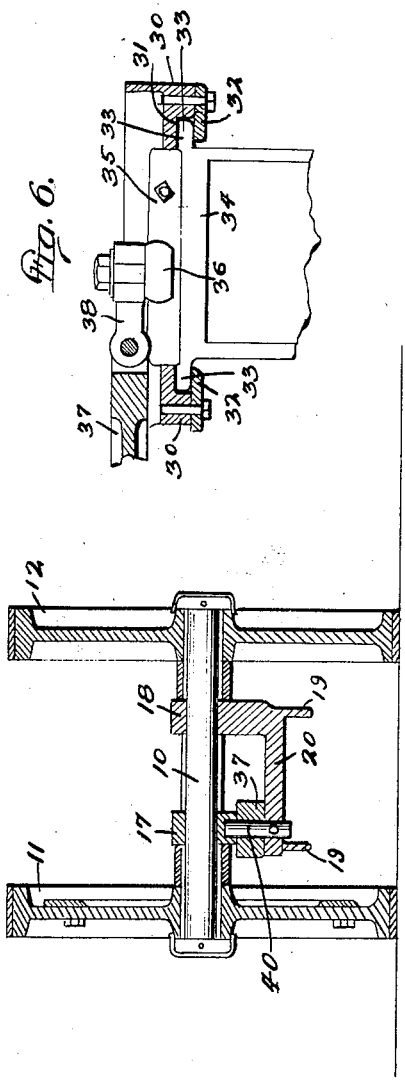
INVENTOR.
Stephen Donner.
BY
Edgar M. Kitchin
His ATTORNEY.

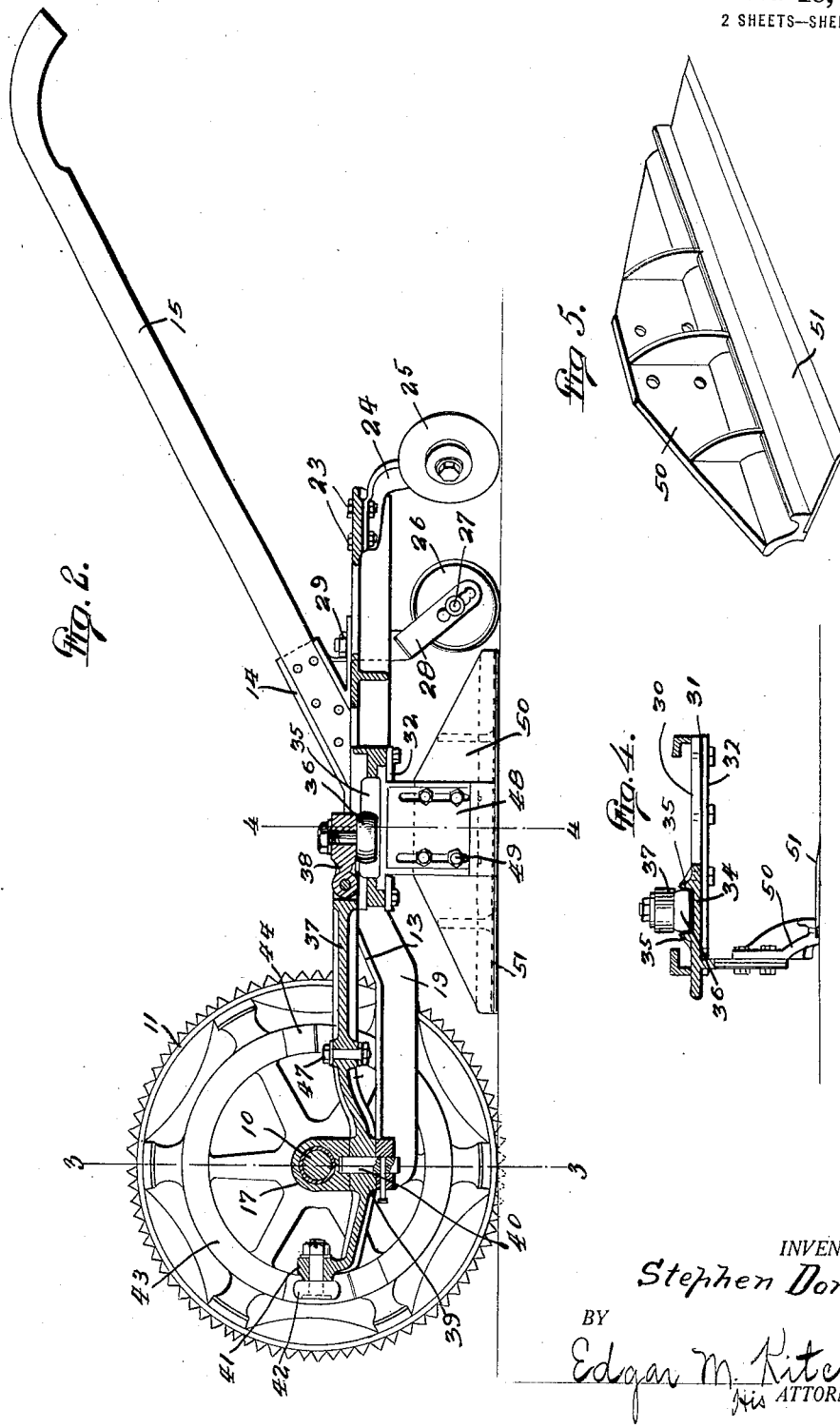

UNITED STATES PATENT OFFICE.

STEPHEN DONNER, OF TOLEDO, OHIO, ASSIGNOR OF ONE-FOURTH TO CHARLES W. FELGNER AND THREE-FOURTHS TO FRED C. BALK, BOTH OF TOLEDO, OHIO.

BEET-BLOCKER.

1,394,152. Specification of Letters Patent. Patented Oct. 18, 1921.

Application filed April 27, 1920. Serial No. 376,939.

*To all whom it may concern:*

Be it known that I, STEPHEN DONNER, a citizen of the United States, residing at Toledo, in the county of Lucas and State of Ohio, have invented certain new and useful Improvements in Beet-Blockers; and I do hereby declare the following to be a full, clear, and exact description of the invention, such as will enable others skilled in the art to which it appertains to make and use the same.

The present invention relates to beet blockers, or machines adapted to pick out and thin rows of beets or similar plants, for aiding in the cultivation of such plants.

An object of the present invention is to provide a beet blocker with a reciprocating knife so timed as to traverse the path of direction of the machine at desired intervals for chopping or cutting out alternate plants in a row, and which blade is operated by detachable and adjustable cams in lieu of chains, gear wheels and similar devices which have heretofore been employed.

Another object of the present invention is to provide an improved blade mounting adapted to maintain the blade in a horizontal position at all times and to relieve the operating connections with the blade from strain incident to supporting the blade.

A further object of the invention is to provide an improved means for supporting the machine at the desired elevation above the ground to admit the blade for cutting out plants in rows of different heights and which are planted in the ground to different depths.

A still further object of the invention is the provision of means for trimming the rows and for supporting such trimmers at the desired angle and in the desired positions at opposite sides of the plants to admit plants or rows of different widths between the trimmers.

With these and further objects in view as will in part hereinafter become apparent and in part be stated, the invention comprises certain novel constructions, combinations and arrangements of parts as subsequently specified and claimed.

In the accompanying drawings,—

Figure 1 is a top plan view of a beet blocker constructed according to the present invention and shown partly in section.

Fig. 2 is a longitudinal, vertical section taken through the same on the line 2—2 of Fig. 1.

Fig. 3 is a transverse section through the forward end of the machine taken on the line 3—3 of Fig. 2.

Fig. 4 is a detail sectional view taken transversely through the intermediate portion of the machine substantially on the line 4—4 of Fig. 2.

Fig. 5 is a detail perspective view of the blade and the blade carrier.

Fig. 6 is a detail enlarged section taken through the reciprocating carriage for the blade and the operating lever, showing the connection between the two.

Referring to the drawings, wherein like parts are designated by similar characters of reference throughout the several views, 10 designates an axle upon which are mounted a pair of wheels 11 and 12. The wheels 11 and 12 preferably have road gripping peripheral surfaces to insure the turning of the wheels during the passage of the machine over the ground. The axle 10 forms the forward support for a frame, and the latter is provided with a pair of side bars 13 which extend rearwardly from the axle and preferably diverge from points beyond the transverse line of the wheels 11 and 12 and which carry handle brackets 14 in which are bolted, or otherwise suitably secured, a pair of handles 15. Preferably, the frame bars 13 extend in parallelism with each other while the handles 15 diverge rearwardly and are suitably formed to be grasped by the operater for lifting and moving the machine. The handles 15 may be reinforced by a cross brace 16 arranged preferably near the rear ends of the handles. The forward ends of the frame bars 13 are provided with upstanding collars or bearings 17 and 18 through which the axle 10 is adapted to pass and which form connections between the axle and the frame. These frame bars 13 are preferably reinforced by integral depending flanges 19, as best shown in Figs. 2 and 3, and the forward ends of the frame bars 13 are connected together by a web or cross piece 20 extending from beneath the bearing 18 to a position beneath the bearing 17.

The rear ends of the frame bars 13 carry a plate 21 which extends rearwardly beneath the handles 15 and which is provided with transversely extending rows of perforations 22 for selectively receiving bolts 23 which couple supports 24 to the plate 21 for carrying trimming disks or knives 25. As shown particularly in Fig. 1, the knives 25 are mounted at acute angles upon the rear ends of the supports 24, so as to dispose the trimmers 25 at the desired rearwardly diverging angles with respect to the path of travel of the machine for operation at opposite sides of the plants.

The frame is supported upon a pair of idler wheels 26. Each idler wheel 26 has a shaft 27 detachably and adjustably mounted in a forked bracket 28 pivoted or otherwise suitably mounted in a bearing 29 at the adjacent side of the machine, the fork 28 being adapted to trail during the forward movement of the machine and admitting of the easy and quick turning or steering of the machine by manipulating the handles 15. Adjustment of the axles 27 of the idler wheels 26 raises and lowers the rear end of the frame, and as the latter carries the cutting blade, as hereinafter pointed out, the cutting blade may thus be adjusted to different heights above the ground.

The frame bars 13 carry a pair of spaced-apart and transversely extending guide rails 30, which are bolted or otherwise suitably mounted on the frame bars 13, and which have undercut grooves 31 in their inner opposite edges and removable flange pieces 32 adapted to normally close the grooves 31 and form supports for outstanding flanges 33 mounted upon a blade carriage 34. The blade carriage 34 may be in the form of a casting having the flanges 33 integral therewith and provided with a pair of suitably spaced-apart upstanding flanges or guides 35 receiving therebetween a connecting roller 36 depending from the under side of an operating lever 37 carried by the frame. The rear end of the operating lever pivotally carries a detachable roller carrier 38 to which is attached the roller 36, which latter is adapted to reciprocate between the flanges 35 and to alternately engage with said flanges during the reciprocation of the blade carriage. The forward end of the operating lever 37 is arched down and provided with an enlarged bearing portion 39 which passes beneath the axle bearing 17 and is pivotally connected beneath such bearing by a pin 40 extending upwardly through the web 20 and into the lower end of the bearing 17 to pivotally support the operating lever beneath the axle 10. The operating lever extends forwardly from the axle 10 and is provided with an upstanding head 41 upon its forward extremity. The head 41 carries a roller 42 adapted to traverse a circular track 43 having one or more cams 44 projecting inwardly from the track and in line with the roller 42. The track 43 is bolted or otherwise detachably secured against the inner side of the wheel 11. A spring 45 is secured at one end to an arm 46 projecting from one frame bar 13 and is secured at its other end upon a pin 47 carried upon the operating lever 37 at a point in rear of the pivot 40 of the operating lever. The spring 45 is of the contracting type and is adapted to yieldingly urge the lever to move in a direction for maintaining the roller 42 against the circular track 43 and the cams 44.

The blade carriage 34 is normally urged by the spring 45 to rest at one side of the machine, and the carriage is provided at its outer edge with a depending bracket plate 48 vertically slotted to receive clamping bolts 49 carried upon the vertical portion of a blade carrier 50. The blade carrier 50 is of suitable length to support the cutting blade 51, and the latter is preferably made up in three or more sections secured to the lower end of the carrier 50 and extending at right angles therefrom to dispose the blade 51 in substantially a horizontal position at all times. The guides 30 terminate against the inner sides of the frame bars 13, and the latter form stops for the blade carriage 34 to limit the reciprocating movement of the same and prevent the accidental detachment of the carriage from the machine.

From the above it is thought the operation will be apparent, for when the machine is moved over a row of plants with the traction wheels 11 and 12 at opposite sides of the row, the plants will pass beneath the frame and between the trimmers 25. The trimmers 25 are adjusted by means of the removable bolts 23 to the desired positions upon the plate 21 of the frame so as to properly trim the row of plants.

The cam track 43 is secured to the drive wheel 11 and is selected for the number of cams 44 desired, and the forward end of the operating lever is urged toward the cam track at all times so that the roller 42 which is maintained against the cam track rides over the smooth and cam portions of the track to impart a reciprocating movement to the operating lever 37 in the properly timed relation. The rear end of the operating lever reciprocates between the frame bars 13 and moves the carriage 34 back and forth. The carriage carries the blade 51 and when the timed impulse is given the operating lever the blade 51 moves transversely and horizontally beneath the frame and chops out of the row the plants which are at that time opposite the cutting blade. By means of the rollers or wheels 26, the height of the plate carriage 34 may be varied, and the blade 51 may be adjusted as to depth by clamping the bolts 49 in the desired positions through the slots of the bracket plate 48. The wheels 26 are arranged at opposite sides of the frame so as not to interfere with the free passage of the plants between the wheels and the free operation of the blade to cut out or block the plants.

It will be noted that the device for the most part may be made in castings and that the structure is such as to require but few relatively strong parts and few movable parts. The operating lever receives direct impact of the cams carried by the drive wheel and delivers the thrust to the blade carriage without the strain of supporting the blade and so as to transmit a direct movement of the blade from the cam. There is thus eliminated all the friction and other parts required in prior constructions which have used toothed wheels, chains and sprockets, and the like.

Access may be readily had to the parts and the latter may be interchanged owing to the mounting of the blade carriage upon the guide bars 30. Removal of the flanges 32 of the guide bars permits the carriage to drop out of the frame and thus access may be quickly had to the blade and its carrier. The operating lever may be readily removed from the frame by withdrawing the pin 40 down through the web 20.

What is claimed is:—

1. A beet blocker including a frame, transverse guides on the frame, a blade carrier slidingly mounted on the guides, a wheel supporting the frame, a cam on the wheel, and an operating lever pivoted on the frame and normally urged with one end toward said cam and connected at its other end to the carrier, whereby to reciprocate the latter by direct action of the cam.

2. A beet blocker having a frame, a wheel supporting the frame, a cam on the wheel, a carriage arranged on the frame to slidingly reciprocate transversely therein, and an operating lever on the frame connected at one end to the carriage and normally urged at its other end toward said cam for operation thereby.

3. In a beet blocker, the combination, with carrier wheels, of a frame supported thereby, a blade movable bodily transversely of the path of the wheels, a carriage supported by the frame, and carrying said blade, and means actuated by the wheels for reciprocating the carriage.

4. A beet blocker including a frame, a pair of wheels mounted on the forward end of the frame, an operating lever pivoted upon the frame, a cam on one of said wheels, a spring connected between said lever and the frame for holding the forward end of the lever against said cam, guide bars extending transversely across the frame, a blade carriage mounted to slide on said guide bars, and a slidable connection between the rear end of the operating lever and said carriage.

5. A beet blocker having a frame, a sliding carriage mounted to reciprocate transversely in the frame, a blade mounted on the carriage, an operating lever pivoted upon the frame and having one end connected to the carriage, and means adapted to engage the forward end of the operating lever for reciprocating the same.

6. A beet blocker having a frame, a pair of wheels supporting the forward end of the frame, a pair of vertically adjustable wheels supporting the rear end of the frame, a transversely movable carriage on the frame, a cutting blade suspended from the carriage, an operating lever pivoted upon the frame with one end connected to the carriage and with its other end extending forwardly between the forward wheels, and means operated by one of the forward wheels for reciprocating the forward end of the lever.

7. In a beet blocker, the combination, with carrier wheels, and a frame sustained thereby, of a carriage movable transversely of the frame, a lever for actuating said carriage, a roller articulated to the lever and engaging the carriage for transmitting movement from the former to the latter, means actuated by the wheels for moving the lever, and a blade sustained by said carriage and movable therewith bodily transversely of the path of travel of the wheels.

8. In a beet blocker, the combination, with carrier wheels and a frame sustained thereby, of a carriage mounted to reciprocate transversely of the frame and having a pendent portion, a blade sustained by and adjustable vertically of said pendent portion and adapted to be moved bodily incident to reciprocations of the carriage, and means actuated by the wheels for reciprocating the carriage.

In testimony whereof I affix my signature in presence of two witnesses.

STEPHEN DONNER.

Witnesses:
ROY SPENCER,
GEO. J. KURTZ.